(12) United States Patent
Shi et al.

(10) Patent No.: US 12,012,488 B2
(45) Date of Patent: Jun. 18, 2024

(54) DUAL-NETWORK COLLAGEN-BASED SUPRAMOLECULAR HYDROGEL AND ITS PREPARATION METHOD

(71) Applicant: Shaanxi University of Science & Technology, Xi'an (CN)

(72) Inventors: Jiabo Shi, Xi'an (CN); Yuxuan Zhang, Xi'an (CN); Jikai Yang, Xi'an (CN); Ruizhen Zhang, Xi'an (CN); Yuxin Du, Xi'an (CN); Xinchun Chen, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 0 days.

(21) Appl. No.: 18/341,874

(22) Filed: Jun. 27, 2023

(65) Prior Publication Data

US 2023/0331938 A1 Oct. 19, 2023

(30) Foreign Application Priority Data

Jun. 29, 2022 (CN) .......................... 202210748429.3

(51) Int. Cl.
*C08J 3/075* (2006.01)
*C08K 3/36* (2006.01)

(52) U.S. Cl.
CPC .............. *C08J 3/075* (2013.01); *C08K 3/36* (2013.01); *C08J 2389/06* (2013.01); *C08K 2201/011* (2013.01)

(58) Field of Classification Search
CPC ................................... C08K 3/36; C08J 3/075
See application file for complete search history.

(56) References Cited

U.S. PATENT DOCUMENTS

2018/0296444 A1* 10/2018 Jha ........................... A61K 6/20
2020/0181564 A1* 6/2020 Kouwer .................. C08J 3/075

FOREIGN PATENT DOCUMENTS

| CN | 111333990 A | | 6/2020 |
| CN | 111607114 A | | 9/2020 |
| CN | 112011067 A | | 12/2020 |
| CN | 112266486 A | * | 1/2021 |
| CN | 112279965 A | | 1/2021 |

(Continued)

OTHER PUBLICATIONS

Machine translation of CN114957728A, publication date Aug. 30, 2022.*

(Continued)

*Primary Examiner* — Jun Li (57) ABSTRACT

Disclosed is a preparation method of a dual-network collagen-based supramolecular hydrogel, including: preparing a silicate nanosheet dispersion and a collagen solution separately; mixing the silicate nanosheet dispersion with the collagen solution followed by stirring to obtain a collagen-silicate nanosheet network; preparing a tannic acid solution and a polyethylene glycol solution separately; mixing the tannic acid solution with the polyethylene glycol solution to obtain a polyethylene glycol-tannic acid network; and subjecting the collagen-silicate nanosheet network and the polyethylene glycol-tannic acid network to reaction to obtain the dual-network collagen-based supramolecular hydrogel. A dual-network collagen-based supramolecular hydrogel prepared by such method is also provided.

6 Claims, 13 Drawing Sheets

(56) References Cited

FOREIGN PATENT DOCUMENTS

| CN | 112575574 | A | | 3/2021 | | |
|---|---|---|---|---|---|---|
| CN | 112661918 | A | | 4/2021 | | |
| CN | 113336972 | A | | 9/2021 | | |
| CN | 114099369 | A | * | 3/2022 | | |
| CN | 114957728 | A | * | 8/2022 | ............. | C08J 3/075 |
| JP | 2020015844 | A | | 1/2020 | | |
| KR | 20190103559 | A | * | 9/2019 | | |
| WO | 2008023025 | A1 | | 2/2008 | | |
| WO | WO-2017079248 | A1 | * | 5/2017 | ............. | A61K 47/10 |
| WO | WO-2018197416 | A1 | * | 11/2018 | ............. | C08F 120/54 |
| WO | WO-2020076453 | A1 | * | 4/2020 | ........... | A61K 31/436 |
| WO | WO-2020077118 | A1 | * | 4/2020 | ............. | B33Y 70/10 |

OTHER PUBLICATIONS

Machine translation of KR20190103559, publication date Sep. 5, 2019.*
Machine translation of CN112661918, Apr. 16, 2021.*
Machine translation of CN113336972, Sep. 3, 2021.*
Li et al., (Construction of multifunctional hydrogel based on the tannic acid-metal coating decorated MoS2 dual nanozyme for bacteria-infected wound healing, Bioactive Materials 9 (2022) 461-474).*
Liu et al. (Recent developments in tough hydrogels for biomedical applications, Gels 2018, 4, 46; doi.org/10.3390/gels4020046).*
Sikdar et al. (Recent advances in the synthesis of smart Hydrogels, Mater. Adv., 2021, 2, 4532-4573).*
Guorong Gao et al., "Progress in Tough and Responsive Hydrogels", Materials China, vol. 34, No. 7-8, Aug. 2015, pp. 571-581.

* cited by examiner

DUAL-NETWORK COLLAGEN-BASED SUPRAMOLECULAR HYDROGEL AND ITS PREPARATION METHOD

CROSS-REFERENCE TO RELATED APPLICATIONS

This application claims the benefit of priority from Chinese Patent Application No. 202210748429.3, filed on Jun. 29, 2022. The content of the aforementioned application, including any intervening amendments thereto, is incorporated herein by reference in its entirety.

TECHNICAL FIELD

The present application relates to the functional application of natural polymer materials, and more particularly to a dual-network collagen-based supramolecular hydrogel and its preparation method.

BACKGROUND

Hydrogels are expected to substitute traditional flexible substrates in the manufacturing of wearable devices due to its high flexibility and stretchability. As a three-dimensional (3D) cross-linked network polymer with high water content, the hydrogel can maintain its structural stability in the presence of water. Due to the excellent designability of the hydrogel granted by the 3D network structure, various functional building blocks (e.g., polyphenols, nanoparticles, and polymer network) can be introduced to give hydrogels other functional characteristics. The materials for fabricating wearable devices and flexible sensors are required to have excellent electric conductivity; whereas, ordinary hydrogels are generally non-conductive. Recently, extensive research has been concentered on the preparation of conductive hydrogels. The conductive hydrogels are usually formed by an intrinsic conductive media and hydrogel networks, where the hydrogel networks play the role as skeleton and the conductive media provides electrical conductivity.

In recent years, owing to their excellent biocompatibility and the presence of abundant reactive groups on their side chains, the hydrogels using collagen as the main building block have been widely applied in the biomedical field and manufacturing of wearable devices. Considerable attention has been paid to the collagen functionalization to remedy defects of pure collagen hydrogels, such as poor mechanical properties and poor antibacterial properties. Chinese patent publication No. 112279965A disclosed a preparation method for a conductive and adhesive hydrogel, where dopamine, oxidized polysaccharides, collagen (or gelatin), polyacrylamide and iron ions are employed to prepare a dual-network hydrogel with good electrical conductivity and adhesion. The resultant hydrogel has satisfactory porosity, swelling rate, electrical conductivity, adhesion and biocompatibility. However, the presence of synthetic polymers weakens degradability of the hydrogel. Moreover, this preparation process struggles with complex operation and higher raw material costs. Therefore, it is urgently required to develop a method for preparing a collagen-based hydrogel with excellent properties and simple operation.

SUMMARY

An object of this application is to provide a dual-network collagen-based supramolecular hydrogel and its preparation method to overcome the deficiencies in the prior art. In this application, nanosheets are used to modify type I collagen to form the first network, and polyethylene glycol and tannic acid are used to build the second network; and then the first network is cross-linked with the second network to prepare a dual-network hydrogel with self-healing property, adhesion, and electrical conductivity.

Technical solutions of this application are described as follows.

In a first aspect, this application provides a method for preparing a dual-network collagen-based supramolecular hydrogel, comprising:

(1) dispersing a silicate nanosheet in deionized water under magnetic stirring for 2 h to obtain a silicate nanosheet dispersion; dissolving a lyophilized type I collagen sponge with a phosphate buffered solution (PBS) at 4° C. in an ice bath to obtain a collagen solution with a concentration of 10 mg/mL; and adding the nanosheet dispersion to the collagen solution followed by stirring in an ice bath for 2 h to obtain a collagen-silicate nanosheet network as the network A, wherein a weight ratio of the lyophilized type I collagen sponge to the silicate nanosheet is 1:0.01~0.2;

(2) dissolving tannic acid in deionized water under ultrasonication to obtain a tannic acid solution with a concentration of 10~40 mg/mL; adding polyethylene glycol into deionized water followed by magnetic stirring at 35° C. to obtain a polyethylene glycol solution with a concentration of 20 mg/mL; and adding the tannic acid solution to the polyethylene glycol solution in a volume ratio of 1:1 followed by stirring for 5 h to obtain a polyethylene glycol-tannic acid network as the network B;

(3) adding the network B obtained in step (2) into the network A obtained in step (1) at 25° C. followed by magnetic stirring for 2 h to obtain a reaction mixture; and adjusting pH of the reaction mixture to weak acidity followed by standing for 12 h for complete reaction to obtain the dual-network collagen-based supramolecular hydrogel.

In some embodiments, in step (1), the silicate nanosheet is lithium magnesium silicate nanosheet or magnesium fluorosilicate nanosheet with a thickness of 0.5~1.5 nm and a diameter of 20~50 nm.

In some embodiments, in step (2), the polyethylene glycol has a molecular weight of 400, 600, or 800.

In some embodiments, in step (2), a weight ratio of the polyethylene glycol to the tannic acid is 1:0.25~2.0.

In some embodiments, in step (3), a weight ratio of the network A to the network B is 1:0.05~0.15.

In some embodiments, the pH of the reaction mixture is adjusted to 3.0~5.0.

In a second aspect, this application provides a dual-network collagen-based supramolecular hydrogel produced by the above preparation method.

Compared with the prior art, the present application has the following beneficial effects.

(1) The preparation method provided herein has simple operation, and the involved raw materials are safe, non-toxic, and degradable.

(2) Regarding the supramolecular hydrogel provided herein, the tannic acid and polyethylene glycol molecules in the polyethylene glycol-tannic acid network are rich in hydroxyl groups, which can form non-covalent bonds, such as hydrogen bond, not only with reactive groups (e.g., amino and hydroxyl groups) on the side chain of collagen molecules, but also with the silicon hydroxyl groups on the surface of silicate nanosheets.

(3) Silicate nanosheets of the present application, as a building block, can enhance the collagen network and the polyethylene glycol-tannic acid network to form the dual-network collagen-based supramolecular hydrogel with excellent natural porosity, antioxidant property, ionic conductivity, adhesion, and self-healing property.

DETAILED DESCRIPTION OF EMBODIMENTS

The dual-network collagen-based supramolecular hydrogel provided herein and its preparation and application will be described in detail below with reference to the embodiments. It should be noted that these embodiments are only illustrative of this disclosure, and not intended to limit the scope of this application. According to the content disclosed herein, those skilled in the art can make some non-essential improvements and adjustments.

Example 1

A silicate nanosheet was dispersed with deionized water under magnetic stirring for 2 h to obtain a silicate nanosheet dispersion; meanwhile, a lyophilized type I collagen sponge was dissolved with PBS (pH 7.4) in an ice bath (4° C.) to obtain a 10 mg/mL collagen solution. Afterwards, the nanosheet dispersion solution was added to the collagen solution, and the mixture was continuously stirred for 2 h under an ice bath to obtain a collagen-silicate nanosheet network dispersion (network A), where a weight ratio of the collagen to the silicate nanosheet was 1:0.1.

Tannic acid was dissolved with deionized water under ultrasonication to obtain a tannic acid solution with a concentration of 20 mg/mL; meanwhile, polyethylene glycol was dispersed in deionized water under magnetic stirring at 35° C. to obtain a polyethylene glycol solution with a concentration of 20 mg/mL. Afterwards, the tannic acid solution was added to the polyethylene glycol solution in a volume ratio of 1:1, and the mixture was continuously stirred for 5 h to produce a homogeneous and transparent polyethylene glycol-tannic acid network (network B), where a weight ratio of the polyethylene glycol to tannic acid was 1:1.

The network B was added to the network A at 25° C. with a weight ratio of the network A to the network B kept at 1:0.09. The reaction mixture was stirred magnetically for 2 h, adjusted to pH 4.0 with 1 mol/L HCl, and subjected to standing for 12 h to produce a dual-network collagen-based supramolecular hydrogel.

Example 2

A silicate nanosheet was dispersed with deionized water under magnetic stirring for 2 h to obtain a silicate nanosheet dispersion; meanwhile, a lyophilized type I collagen sponge was dissolved with PBS (pH 7.4) in an ice bath (4° C.) to obtain a 10 mg/mL collagen solution. Afterwards, the nanosheet dispersion solution was added to the collagen solution, and the mixture was continuously stirred for 2 h under an ice bath to obtain a collagen-silicate nanosheet network dispersion (network A), where a weight ratio of the collagen to the silicate nanosheet was 1:0.1.

Tannic acid was dissolved with deionized water under ultrasonication to obtain a tannic acid solution with a concentration of 20 mg/mL; meanwhile, polyethylene glycol was dispersed in deionized water under magnetic stirring at 35° C. to obtain a polyethylene glycol solution with a concentration of 20 mg/mL. Afterwards, the tannic acid solution was added to the polyethylene glycol solution in a volume ratio of 1:1, and the mixture was continuously stirred for 5 h to produce a homogeneous and transparent polyethylene glycol-tannic acid network (network B), where a weight ratio of the polyethylene glycol to tannic acid was 1:1.

The network B was added to the network A at 25° C. with a weight ratio of the network A to the network B kept at 1:0.11. The reaction mixture was stirred magnetically for 2 h, adjusted to pH 4.0 with 1 mol/L HCl, and subjected to standing for 12 h to produce a dual-network collagen-based supramolecular hydrogel.

Example 3

A silicate nanosheet was dispersed with deionized water under magnetic stirring for 2 h to obtain a silicate nanosheet dispersion; meanwhile, a lyophilized type I collagen sponge was dissolved with PBS (pH 7.4) in an ice bath (4° C.) to obtain a 10 mg/mL collagen solution. Afterwards, the nanosheet dispersion solution was added to the collagen solution, and the mixture was continuously stirred for 2 h under an ice bath to obtain a collagen-silicate nanosheet network dispersion (network A), where a weight ratio of the collagen to the silicate nanosheet was 1:0.1.

Tannic acid was dissolved with deionized water under ultrasonication to obtain a tannic acid solution with a concentration of 20 mg/mL; meanwhile, polyethylene glycol was dispersed in deionized water under magnetic stirring at 35° C. to obtain a polyethylene glycol solution with a concentration of 20 mg/mL. Afterwards, the tannic acid solution was added to the polyethylene glycol solution in a volume ratio of 1:1, and the mixture was continuously stirred for 5 h to produce a homogeneous and transparent polyethylene glycol-tannic acid network (network B), where a weight ratio of the polyethylene glycol to tannic acid was 1:1.

The network B was added to the network A at 25° C. with a weight ratio of the network A to the network B kept at 1:0.13. The reaction mixture was stirred magnetically for 2 h, adjusted to pH 4.0 with 1 mol/L HCl, and subjected to standing for 12 h to produce a dual-network collagen-based supramolecular hydrogel.

Figure 1A:
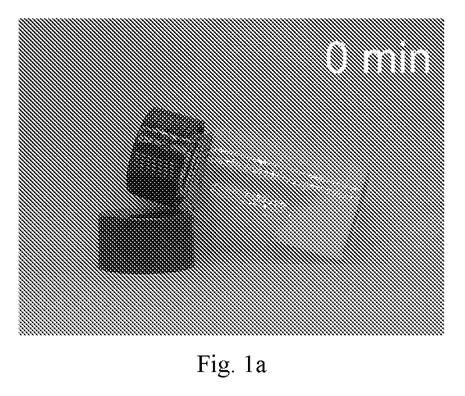
FIGS. 1a-c are digital photographs of a dual-network collagen-based supramolecular hydrogel prepared in Example 2 of this application during a gel-forming process, where 1a: 0 min; 1b: 10 min; and 1c: 30 min.
Figure 1B:
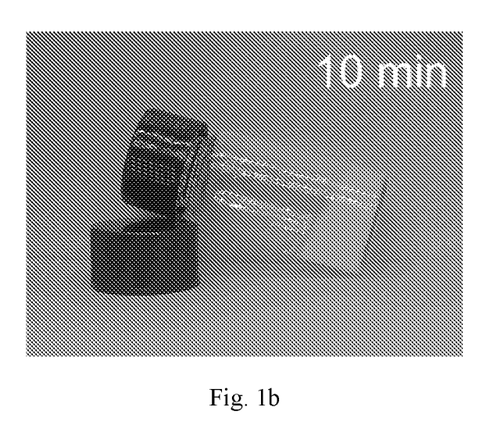
Figure 1C:
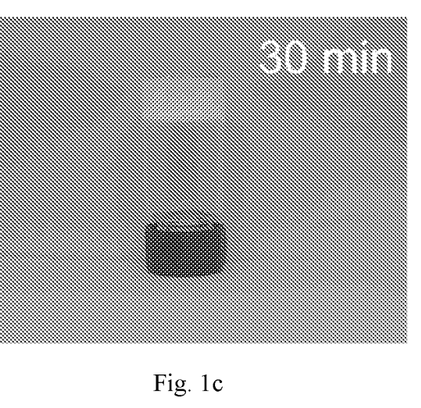

FIGS. 1a-c are digital photographs of the dual-network collagen-based supramolecular hydrogel (Example 2) in the gel-forming process from 0 min to 30 min. It is demonstrated by FIGS. 1a-c that the dual-network collagen-based supramolecular hydrogels have high gel-forming speed and good gel-forming state.

Figure 2A:
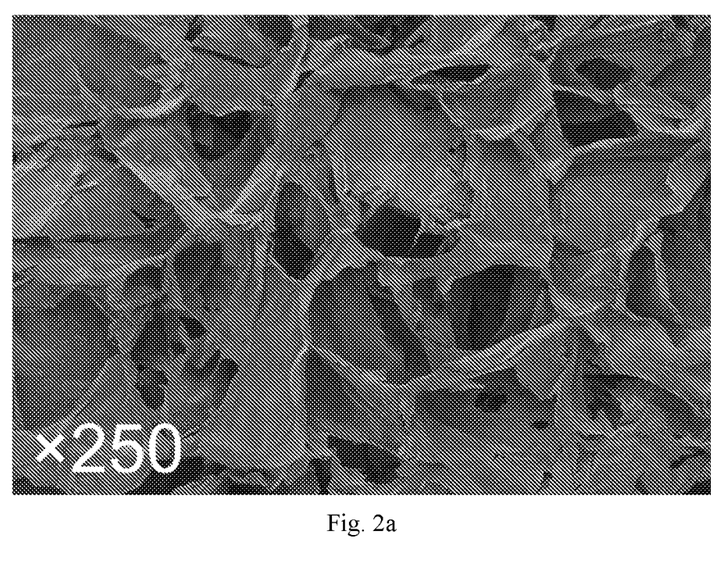
FIGS. 2a-b are scanning electron microscopy (SEM) images of the dual-network collagen-based supramolecular hydrogel prepared in Example 2 of this application.
Figure 2B:
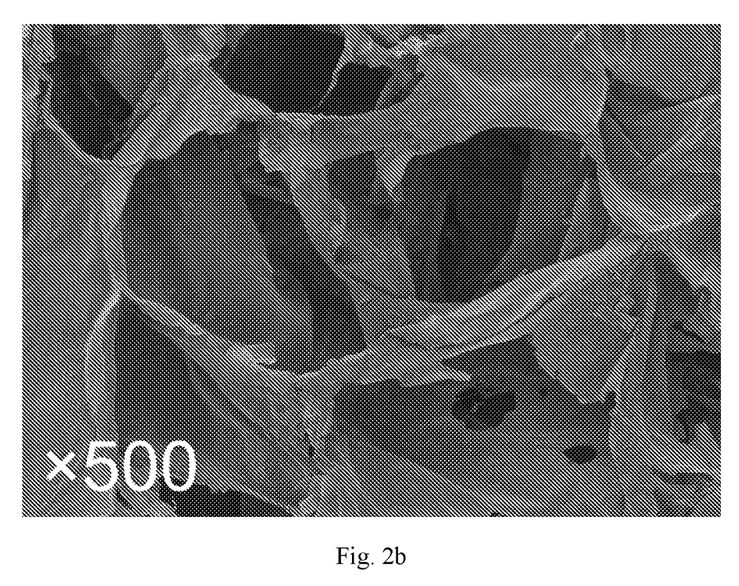

FIGS. 2a-b are SEM (scanning electron microscope) images of the dual-network collagen-based supramolecular hydrogel (Example 2), where a: ×250; and b: ×500. It can be observed that the dual-network collagen-based supramolecular hydrogels prepared herein are porous, and have small pore size and even pore distribution.

Figure 3A:
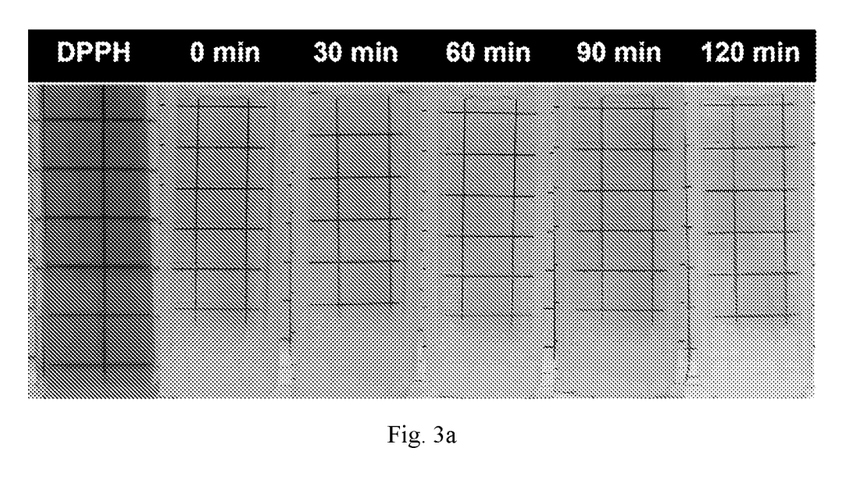
FIGS. 3a-b show free radical scavenging ability of the dual-network collagen-based supramolecular hydrogel prepared in Example 2 of this application.
Figure 3B:
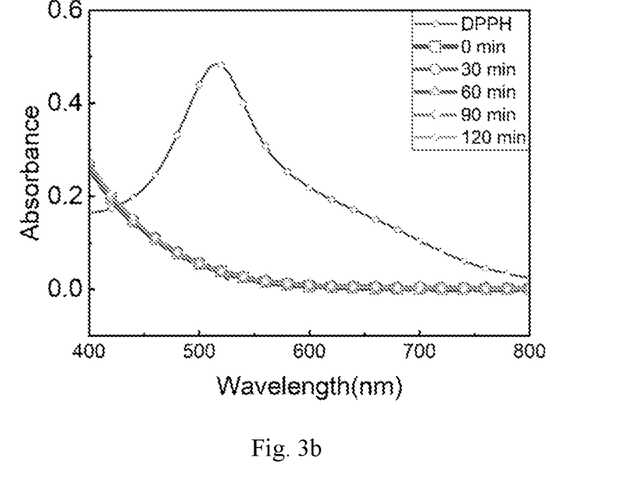

FIGS. 3a-b shows free radical scavenging ability of the dual-network collagen-based supramolecular hydrogel (Example 2), where a: showing the ability of the dual-network collagen-based supramolecular hydrogel to scavenge the free radicals in 1,1-diphenyl-2-picrylhydrazyl (DPPH); and b: visible spectrum of the dual-network collagen-based supramolecular hydrogel in the presence of DPPH solution under different reaction times. It can be observed that the dual-network collagen-based supramolecular hydrogel can scavenge the DPPH free radicals fast, and the absorbance at the wavelength of 515 nm decreases significantly with the increase of reaction time, demonstrating excellent antioxidant property of the dual-network collagen-based supramolecular hydrogels.

Figure 4:
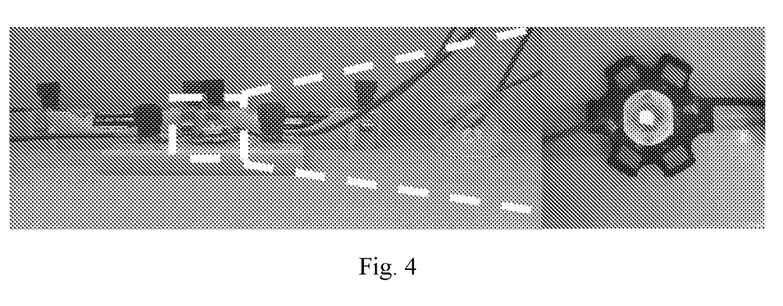
FIG. 4 is a schematic diagram of electrical conductivity test of the dual-network collagen-based supramolecular hydrogel prepared in Example 2 of this application.
Figure 5A:
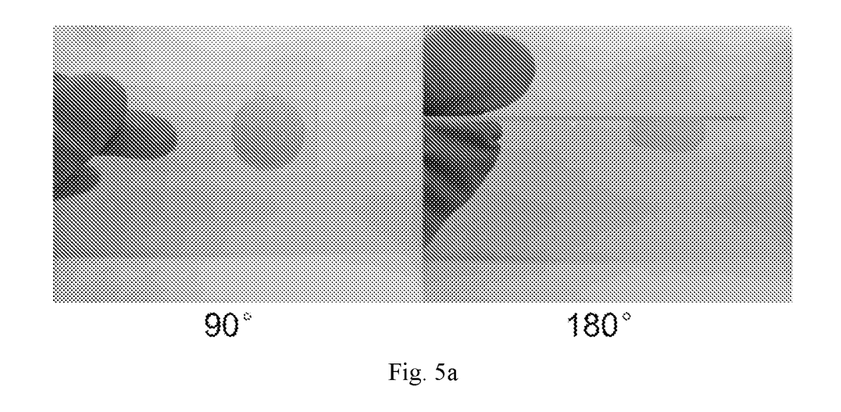
FIGS. 5a-d schematically depict adhesion test results of the dual-network collagen-based supramolecular hydrogel prepared in Example 2 of this application.
Figure 5B:
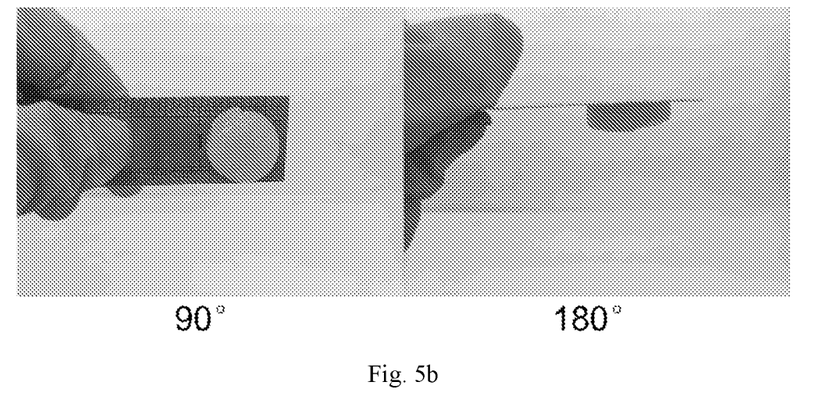
Figure 5C:
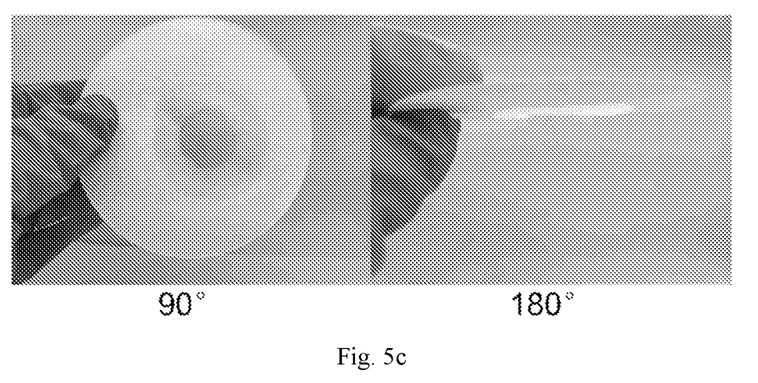
Figure 5D:
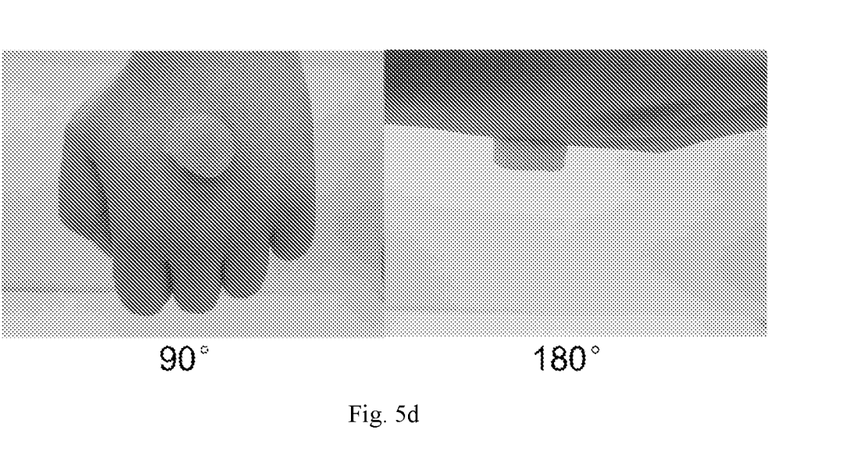

FIG. 4 reveals the electrical conductivity test results of the dual-network collagen-based supramolecular hydrogel (Example 2), from which it can be seen that the light-emitting diode emits light normally when the dual-network collagen-based supramolecular hydrogel is connected to the circuit, indicating that this hydrogel is electrically conductive.

FIGS. 5a-d show adhesion test of the dual-network collagen-based supramolecular hydrogel (Example 2) on various substrates at different angles with respect to the ground, where a: quartz glass; b: steel; c: filter paper; and d: human skin.

Figure 6:
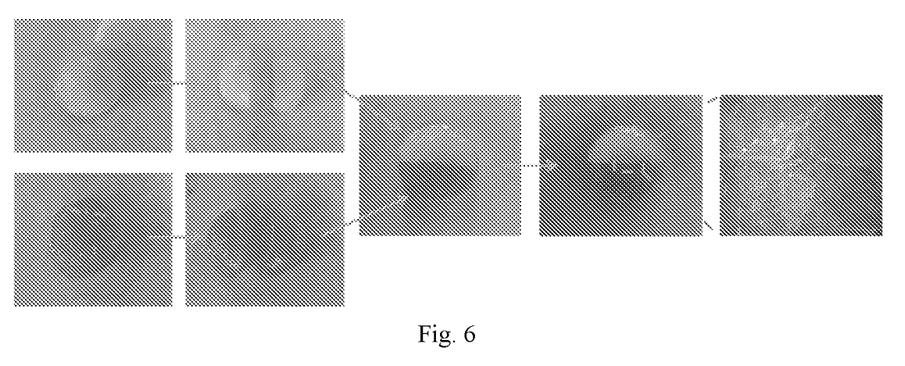
FIG. 6 schematically shows test results of self-healing properties of the dual-network collagen-based supramolecular hydrogel prepared in Example 2 of this application.

FIG. 6 displays test results of self-healing properties of the dual-network collagen-based supramolecular hydrogel (Example 2). After this hydrogel was cut and then immersed in PBS for 12 hours with the cut surfaces clinging to each other, it can be found that the cut can be spontaneously healed, and no obvious cracks is observed under the microscope, demonstrating good self-healing property of the dual-network collagen-based supramolecular hydrogel conductive hydrogels.

What is claimed is:
1. A method for preparing a dual-network collagen-based supramolecular hydrogel, comprising:
  (1) dispersing a silicate nanosheet in deionized water under magnetic stirring for 2 h to obtain a silicate nanosheet dispersion; dissolving a lyophilized type I collagen sponge with a phosphate buffered solution (PBS) at 4° C. in an ice bath to obtain a collagen solution with a concentration of 10 mg/mL; and adding the nanosheet dispersion to the collagen solution followed by stirring in an ice bath for 2 h to obtain a collagen-silicate nanosheet network as network A, wherein a weight ratio of the lyophilized type I collagen sponge to the silicate nanosheet is 1:0.01~0.2;
  (2) dissolving tannic acid in deionized water under ultrasonication to obtain a tannic acid solution with a concentration of 10~40 mg/mL; adding polyethylene glycol into deionized water followed by magnetic stirring at 35° C. to obtain a polyethylene glycol solution with a concentration of 20 mg/mL; and adding the tannic acid solution to the polyethylene glycol solution in a volume ratio of 1:1 followed by stirring for 5 h to obtain a polyethylene glycol-tannic acid network as network B; and
  (3) adding the network B obtained in step (2) into the network A obtained in step (1) at 25° C. followed by magnetic stirring for 2 h to obtain a reaction mixture; and adjusting pH of the reaction mixture to weak acidity followed by standing for 12 h for complete reaction to obtain the dual-network collagen-based supramolecular hydrogel.

2. The method of claim 1, wherein in step (1), the silicate nanosheet is lithium magnesium silicate nanosheet or magnesium fluorosilicate nanosheet with a thickness of 0.5~1.5 nm and a diameter of 20~50 nm.

3. The method of claim 2, wherein in step (2), the polyethylene glycol has a molecular weight of 400, 600, or 800.

4. The method of claim 3, wherein in step (2), a weight ratio of the polyethylene glycol to the tannic acid is 1:0.25~2.0.

5. The method of claim 4, wherein in step (3), a weight ratio of the network A to the network B is 1:0.05~0.15.

6. The method of claim 5, wherein in step (3), the pH of the reaction mixture is adjusted to 3.0~5.0.

* * * * *